(12) United States Patent
Zhu

(10) Patent No.: US 8,914,053 B2
(45) Date of Patent: Dec. 16, 2014

(54) SYSTEM AND METHOD FOR SELECTING TRANSCEIVERS TO PROVIDE WIRELESS COMMUNICATION SERVICE FOR A WIRELESS USER ENDPOINT

(75) Inventor: Chenxi Zhu, Fairfax, CA (US)

(73) Assignee: Fujitsu Limited, Kawasaki-shi (JP)

( * ) Notice: Subject to any disclaimer, the term of this patent is extended or adjusted under 35 U.S.C. 154(b) by 269 days.

(21) Appl. No.: 13/490,042

(22) Filed: Jun. 6, 2012

(65) Prior Publication Data

US 2013/0122946 A1    May 16, 2013

Related U.S. Application Data

(60) Provisional application No. 61/558,864, filed on Nov. 11, 2011.

(51) Int. Cl.
| | |
|---|---|
| *H04W 76/00* | (2009.01) |
| *H04W 48/20* | (2009.01) |
| *H04W 88/08* | (2009.01) |
| *H04W 84/04* | (2009.01) |

(52) U.S. Cl.
CPC ............ *H04W 48/20* (2013.01); *H04W 88/085* (2013.01); *H04W 84/047* (2013.01)
USPC ........ 455/500; 455/522; 455/420; 455/562.1; 370/252

(58) Field of Classification Search
CPC . H04W 48/20; H04W 84/047; H04W 88/085; H04W 48/00; H04W 48/18; H04W 48/02; H04W 40/00; H04W 40/02; H04W 40/24; H04W 72/00
USPC ............. 455/550, 442, 500, 450, 452.2, 454, 455/464, 13.1, 121; 370/343, 485, 352, 370/252, 329
See application file for complete search history.

(56) References Cited

U.S. PATENT DOCUMENTS

| | | | |
|---|---|---|---|
| 2003/0156603 A1* | 8/2003 | Rakib et al. | 370/485 |
| 2004/0264442 A1* | 12/2004 | Kubler et al. | 370/352 |
| 2006/0276227 A1 | 12/2006 | Dravida | |
| 2007/0213065 A1* | 9/2007 | Kang et al. | 455/442 |
| 2008/0076433 A1 | 3/2008 | Cheng et al. | |
| 2009/0103509 A1* | 4/2009 | Sanderford et al. | 370/343 |

(Continued)

OTHER PUBLICATIONS

International Search Report and Written Opinion; PCT/US2012/063141; pp. 16, Jun. 10, 2013.

(Continued)

*Primary Examiner* — Tan Trinh
(74) *Attorney, Agent, or Firm* — Baker Botts L.L.P.

(57) ABSTRACT

In accordance with one or more embodiments of the present disclosure a method for selecting transceivers to provide wireless communication service for a wireless user endpoint comprises determining at least one characteristic of at least one communication channel between a wireless user endpoint and a first plurality of transceivers. The determination of the at least one characteristic is based on a reference signal generated by the wireless user endpoint for reception by the first plurality of transceivers. The method further comprises analyzing the at least one characteristic of the at least one communication channel. The method additionally comprises selecting at least one transceiver of the first plurality of transceivers to provide wireless communication service for the wireless user endpoint. The selection of the at least one transceiver is based on the at least one characteristic of the at least one communication channel.

16 Claims, 3 Drawing Sheets

(56) References Cited

U.S. PATENT DOCUMENTS

| | | | |
|---|---|---|---|
| 2011/0223958 A1* | 9/2011 | Chen et al. | 455/522 |
| 2011/0223960 A1* | 9/2011 | Chen et al. | 455/522 |
| 2012/0069877 A1* | 3/2012 | Tzannes et al. | 375/219 |
| 2012/0115518 A1* | 5/2012 | Zeira et al. | 455/500 |
| 2012/0218911 A1* | 8/2012 | Zhu et al. | 370/252 |
| 2012/0220333 A1* | 8/2012 | Zhu | 455/525 |
| 2012/0243492 A1* | 9/2012 | Muharemovic et al. | 370/329 |
| 2012/0269186 A1* | 10/2012 | Kubler et al. | 370/352 |
| 2012/0281668 A1* | 11/2012 | Dinan et al. | 370/329 |
| 2013/0223259 A1* | 8/2013 | Pratt et al. | 370/252 |

OTHER PUBLICATIONS

Invitation to Pay Additional Fees; PCT/US2012/063141; pp. 7, Apr. 16, 2013.

* cited by examiner

SYSTEM AND METHOD FOR SELECTING TRANSCEIVERS TO PROVIDE WIRELESS COMMUNICATION SERVICE FOR A WIRELESS USER ENDPOINT

RELATED APPLICATION

This application claims benefit under 35 U.S.C. §119(e) of U.S. Provisional Application Ser. No. 61/558,864, entitled "USER EQUIPMENT TRANSMITTED REFERENCE SIGNAL IN A DISTRIBUTED WIRELESS NETWORK," filed Nov. 11, 2011, the entire content of which is incorporated herein by reference.

TECHNICAL FIELD

The present invention relates generally to communication networks and, more particularly, to a user equipment reference signal within wireless communication networks.

BACKGROUND

Distributed antenna systems are becoming more popular in next generation wireless networks. Distributed antenna systems may include one or more subsystems that may include a control unit (e.g., a Radio Element Control or a Baseband Unit) and one or more transceivers (e.g., Radio Elements or Remote Radio Heads) controlled by a respective control unit. Within each subsystem, the transceivers may be distributed around different locations while being connected via a wired connection (e.g., optical fiber) to their associated control unit. Via the wired connection, a control unit may coordinate providing wireless communication service by one or more transceivers for a wireless user endpoint within range of the transceivers. Additionally, the control units of the subsystems may communicate with each other to coordinate providing wireless communication service for wireless user endpoints. Accordingly, this web of control units and transceivers may jointly work together to provide wireless communication service to wireless user endpoints that are located within the distributed antenna system.

Distributed antenna systems may greatly increase the capacity of a wireless communications network. However, traditional systems and methods used in facilitating communications with a wireless user endpoint and transceiver may cause inefficiencies when used with distributed antenna systems.

SUMMARY

In accordance with one or more embodiments of the present disclosure a method for selecting transceivers to provide wireless communication service for a wireless user endpoint comprises determining at least one characteristic of at least one communication channel between a wireless user endpoint and a first plurality of transceivers. The determination of the at least one characteristic is based on a reference signal generated by the wireless user endpoint for reception by the first plurality of transceivers. The method further comprises analyzing the at least one characteristic of the at least one communication channel. The method additionally comprises selecting at least one transceiver of the first plurality of transceivers to provide wireless communication service for the wireless user endpoint. The selection of the at least one transceiver is based on the at least one characteristic of the at least one communication channel.

The object and advantages of the present invention will be realized and achieved by the elements and combinations particularly pointed out in the claims. It is understood that both the foregoing general description and the following detailed description are exemplary and explanatory and are not restrictive of the invention, as claimed.

BRIEF DESCRIPTION OF THE DRAWINGS

Embodiments of the present disclosure are made by way of example and not limited by the following figures.

DETAILED DESCRIPTION

Figure 1:
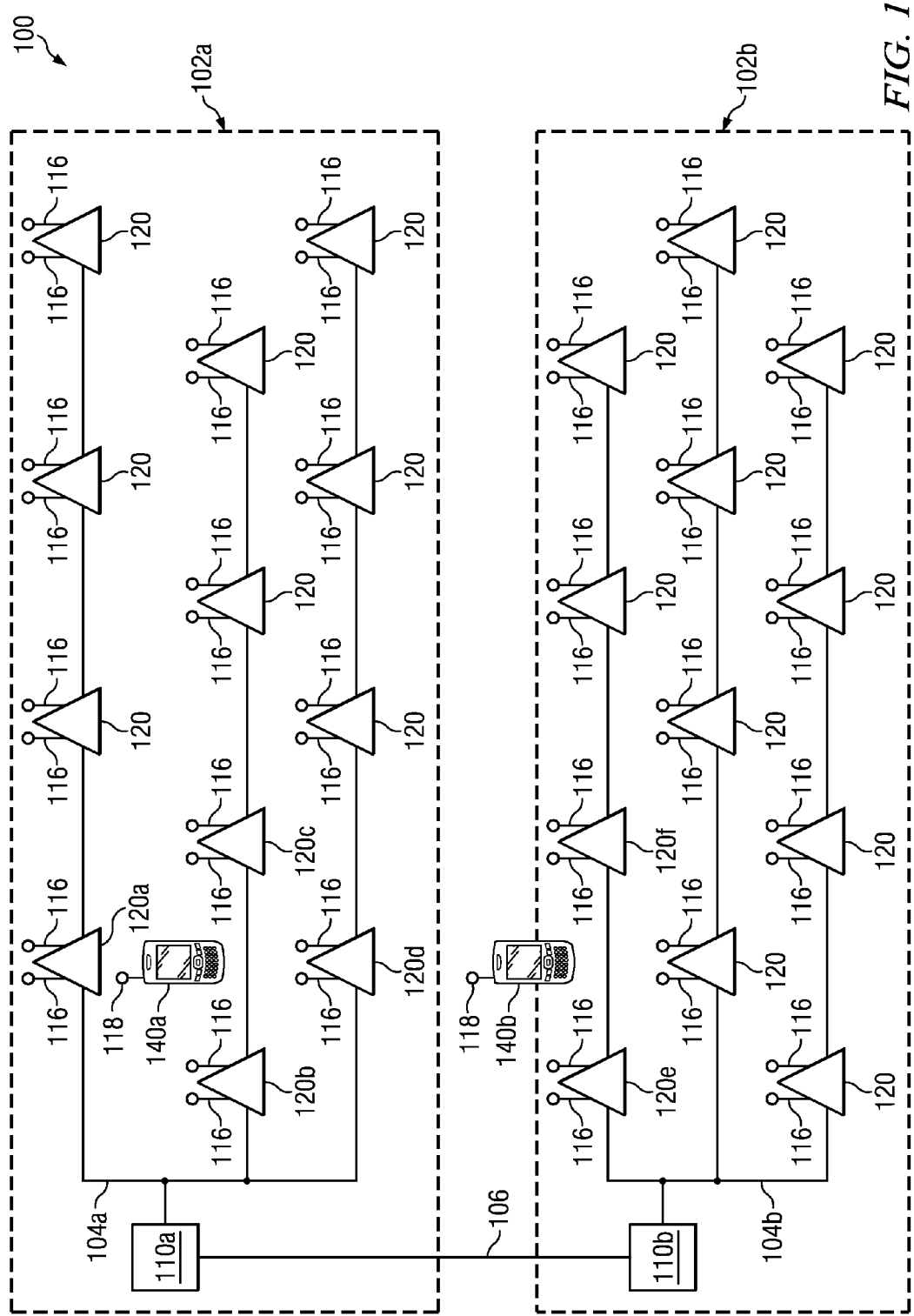
FIG. 1 illustrates a distributed antenna system in accordance with some embodiments of the present disclosure.

FIG. 1 illustrates a distributed antenna system 100 comprising a plurality of control units 110 and transceivers 120 configured to provide wireless service to one or more wireless user endpoints 140 located within distributed antenna system 100. In accordance with an embodiment of the present disclosure, control units 110, transceivers 120 and wireless user endpoint 140 may be configured such that a plurality of transceivers 120 near wireless user endpoint 140 may be dynamically organized into a "service cluster" of transceivers 120 to provide wireless service to a wireless user endpoint 140. The "service cluster" may be based on a reference signal generated and transmitted by wireless user endpoint 140. The service cluster may accordingly act as a cell dynamically configured around wireless user endpoint 140. As detailed below, such a configuration may allow for improved and more efficient wireless communication service as provided to a wireless user endpoint 140 by distributed antenna system 100.

Distributed antenna system 100 may provide wireless communication service for any suitable number of wireless user endpoints 140 over a geographic area via control units 110 and transceivers 120. For example, distributed antenna system 100 may be used to provide wireless coverage for an entire building, a city block, a campus, or any other applicable geographic area.

Distributed antenna system 100 may include one or more subsystems 102. For example, in the illustrated embodiment, distributed antenna system 100 may include, but is not limited to, subsystems 102a, and 102b. Sub-systems 102a and 102b may include control units 110a and 110b, respectively. Subsystems 102a and 102b may each include a plurality of transceivers 120 connected to a respective control unit 110 via a wired (e.g. optical fiber) connection 104. Each control unit 110 may communicate with its respective transceivers 120 via the wired connection 104 to coordinate wireless communication by the transceivers 120 within a sub-network 102 with a wireless user endpoint 140. For example, in some embodiments, control unit 110a may communicate with transceivers 120a, 120b, and 120c of sub-network 102a via wired connection 104a to coordinate communication between wireless user endpoint 140a and transceivers 120a, 102b, and 120c. Control units 110 may use any suitable wired technologies or protocols (e.g., Common Public Radio Interface (CPRI)) to communicate with their respective transceivers 120.

Additionally, control units 102 may also be coupled via a wired connection (e.g., fiber optic) to facilitate communications between distributed antenna system 100 and one or more wireless user endpoints 140. For example, control units 110a and 110b may be connected via a wired connection 106. Accordingly, control units 110a and 110b may communicate to coordinate handoffs of wireless communication service when a wireless user endpoint 140 moves from one sub-network 102 to another. As way of example, wireless user endpoint 140b may move from sub-network 102a to sub-network 102b. Control units 110a and 110b may accordingly communicate with each other over wired connection 106 to coordinate a handoff from sub-network 102a providing wireless communication service to wireless user endpoint 140b to sub-network 102b providing wireless communication service to wireless user endpoint 140b.

In the same or alternative embodiments, control units 110 may also communicate with each other to coordinate joint communication between a wireless user endpoint 140 and transceivers of different sub-networks. For example, control units 110a and 110b may communicate over wired connection 106 to coordinate joint communication between wireless user endpoint 140b and transceivers 120d (of sub-network 102a), 120e (of sub-network 102b), and 120f (of sub-network 102b). Control units 110 may communicate with each other using any suitable wired technologies or protocols (e.g., (CPRI)).

Control units 110 may include any combination of hardware, software embedded in a computer readable medium, and/or encoded logic incorporated in hardware or otherwise stored (e.g., firmware) to implement any number of communication protocols that allow for wired or wireless exchange of packets in distributed antenna system 100. As way of example, and not limitation, a control unit 110 may be a Radio Element Control or a Baseband Unit. As mentioned above, control units 110 may be configured to coordinate and control the wireless communication of one or more transceivers 120 with one or more wireless user endpoints 140. A control unit 110 may be in the same location as a transceiver 120 or may be located remotely from transceivers 120.

In the illustrated embodiment, control units 110 may direct the communication between a wireless user endpoint 140 and one or more transceivers 120 via wired connections 104 and one or more antenna ports 116 of one or more transceivers 120. For example, control unit 110a may send data destined for wireless user endpoint 140a through wired connections 104a to transceivers 120a, 120b, and 120c. Transceivers 120a, 120b, and 120c may then send the data to wireless user endpoint 140a via one or more wireless connections between one or more antenna ports 116 of transceivers 120a, 120b, and 120c, and one or more antenna ports 118 of wireless user endpoint 140a.

As another example, data from wireless user endpoint 140a may be received by transceivers 120a, 120b, and 120c through one or more wireless connections between wireless user endpoint 110a and one or more antenna ports 116 of transceivers 120a, 120b, and 120c. This data may then be relayed to control unit 110a by transceivers 120a, 120b, and 120c through wired connections 104a, which may process the data. Control units 110 and transceivers 120 may communicate with a wireless user endpoint 140 using any of a variety of different wireless technologies, including, but not limited to, orthogonal frequency division multiple access (OFDMA) and the long term evolution-advanced (LTE-A) protocol as defined in the 3rd Generation Partnership Project (3GPP) Release 10 or beyond.

Although not shown in the embodiment depicted, control units 110 may also be coupled to any network or combination of networks capable of transmitting signals, data, and/or messages, including signals, data, or messages transmitted through WebPages, e-mail, text chat, voice over IP (VoIP), and instant messaging in order to provide services and data to wireless user endpoints 140. For example, control units 110 may be coupled to one or more LANs, WANs, MANs, PSTNs, WiMAX networks, global distributed networks such as the Internet, or any other form of wireless or wired networking.

A transceiver 120 may include any combination of hardware or software embedded in a computer readable medium, and/or encoded logic incorporated in hardware or otherwise stored (e.g., firmware) to implement any number of communication protocols that allow for the wireless exchange of packets with wireless user endpoints 140 via antenna ports 116 of transceivers 140. For example, a transceiver 120 may be a Remote Radio Head (RRH). As mentioned above, transceivers 120 may communicate with wireless user endpoints 140 using any of a variety of different wireless technologies, including, but not limited to, OFDMA and the LTE-A protocol. Transceivers 120 may be configured to wirelessly send control signals and data traffic to wireless user endpoints 140 via antenna ports 116 using any suitable communications protocol.

Wireless user endpoints 140 may comprise any type of wireless device able to send and receive data and/or signals to and from transceivers 120. Some examples of wireless user endpoints 140 include, but are not limited to, desktop computers, PDAs, cell phones, laptops, and/or VoIP phones. Wireless user endpoints 140 may provide data or network services to a user through any combination of hardware, software embedded in a computer readable medium, and/or encoded logic incorporated in hardware or otherwise stored (e.g., firmware). Wireless user endpoints 140 may also include unattended or automated systems, gateways, other intermediate components or other devices that may send or receive data and/or signals.

Control units 110 and transceivers 120 may utilize any suitable communication scheme to communicate with a wireless user endpoint 140. For example, a multiple input/multiple output (MIMO) scheme may be used that utilizes multiple physical antenna ports to communicate a data stream to a wireless user endpoint 140. In particular embodiments, a control unit 110 may employ a down link coordinated multi-processing (DL CoMP) scheme where multiple antenna ports 116 that are located at one or more transceivers 120 are used to communicate with a wireless user endpoint 140. The wireless user endpoint 140 may combine multiple signals received from multiple transceivers 120 into a single communication. Similarly, in an up link coordinated multi-processing scheme (UL CoMP), a wireless user endpoint 140 may transmit a signal to a plurality of transceivers 120. The transceivers 120 may forward the signal and/or information associated with the signal to a control unit 110 associated with the transceivers 120. The control unit 110 may interpret and process the information received from the wireless user endpoint 140 via the transceivers 120.

Various types of information may be sent to or from wireless user endpoints 140. In some embodiments, control units 110 may generate control messages for their respective sub-network 102 and may transmit these control messages to the transceivers 120 included in their respective sub-networks 102 via connections 104. These control messages may be jointly transmitted by each antenna port 116 of the transceivers 120 of the sub-system 102. The control messages may include information (e.g., scheduling or demodulation information) that allows a wireless user endpoint 140 to extract relevant data traffic from transmissions sent from a transceiver 120. In particular embodiments, these control messages conform to the LTE-A standard. For example, the control messages may include cell-specific reference signals (CRS) such as primary synchronization signal (PSS), secondary synchronization signal (SSS), physical broadcast channel (PBCH), and/or physical downlink control channel (PD-CCH) reference signals.

Various other signals may be communicated by control units 110 and transceivers 120. For example, in some embodiments each antenna port 116 of transceivers 120 may transmit a channel reference signal (as directed by a control unit 110), such as a channel state information reference signal (CSI-RS) as defined in LTE-A. The channel reference signal may include a sequence of values, such as a pseudo-random sequence. In some embodiments, a plurality of transceivers 120 may be organized into a group having an assigned group identifier (group ID) and may generate and transmit the same reference signal based on the common group ID. In the same or alternative embodiments, the transceivers 120 of a sub-network 102 may be organized into a group such that all the transceivers 120 of the sub-network 102 may have the same group ID and may generate the same reference signal. In alternative embodiments, the transceivers 120 of a sub-network 102 may be organized into more than one group and/or the transceivers 120 of different sub-networks 102 may be organized into the same group.

A wireless user endpoint 140 may receive one or more channel reference signals and may "estimate" one or more associated communication channels between the wireless user endpoint 140 and the one or more antenna ports 116 transmitting the one or more channel reference signals. The wireless user endpoint 140 may estimate a communication channel by determining one or more characteristics of the channel based on a channel reference signal. For example, the wireless user endpoint 140 may estimate a channel based on the received signal strength of an associated channel reference signal.

In embodiments where multiple transceivers 120 transmit the same reference signal, a composite channel may be estimated as the overall communication between the wireless user endpoint 140 and the group of transceivers 120 transmitting the same reference signal. For example, transceivers 120 of sub-network 102a may be included in the same group (and accordingly have the same group ID) and may each transmit the same reference signal. Wireless user endpoint 140a may accordingly receive the same reference signal from each transceiver 120 of sub-network 102a. Additionally, transceivers 120 of sub-network 102b may also be included in the same group (but different from the group associated with sub-network 102a) and each transceiver 120 of sub-network 102b may transmit the same reference signal (but different from the reference signal associated with sub-network 102a) such that wireless user endpoint 140a may receive the same reference signal from each transceiver 120 of sub-network 102b. Wireless user endpoint 140a may consequently estimate an overall channel for sub-network 102a ($H_{102a}$) and may estimate a different overall channel for sub-network 102b ($H_{102b}$).

After estimating the channels, a wireless user endpoint 140 may select a channel over which to communicate based on the quality (e.g., strength) of the channels as indicated by the channel estimations. For example, as mentioned above, wireless user endpoint 140a may estimate an overall channel for sub-network 102a ($H_{102a}$) and may estimate a different overall channel for sub-network 102b ($H_{120b}$). The channel estimations may indicate that channel $H_{102a}$ is stronger than channel $H_{102b}$ because, for example, in the illustrated embodiment wireless user endpoint 140a is located within sub-group 102a. Accordingly, wireless user endpoint 140a may select channel $H_{102a}$ (and consequently sub-network 102a) for wireless communication.

In accordance with some embodiments of the present disclosure, a wireless user endpoint 140 may also be configured to generate a reference signal based on the group ID of the selected channel. For example, after selecting channel $H_{102a}$ for communication, wireless user endpoint 140a may generate a reference signal based on the group ID of sub-network 102a. In some embodiments, a group ID may be encoded in the reference signal transmitted by transceivers 120. The reference signal for a wireless user endpoint 140 may be generated based on the group ID such that the reference signal is identified within the group associated with the group ID and ignored outside of the group associated with the group ID. For example, the reference signal generated by wireless user endpoint 140a using the group ID of sub-network 102a may be such that the reference signal is recognized and processed by control unit 110a and/or the transceivers 120 of sub-network 102a, but the reference signal may not be recognized and processed by control unit 110b and the transceivers 120 of sub-network 102b.

Any suitable method or scheme may be used to generate a reference signal based on a group ID such that the reference signal is recognized and processed within that group but not another group. For example a group ID may be used to create a sixteen bit sequence within the reference signal that includes a check error sum. The check error sum may be recognized by the transceivers 120 and/or control units 110 associated with the group ID and ignored by the transceivers 120 and/or control units 110 associated with a different group ID.

In one or more embodiments of the present disclosure, one or more transceivers 120 may receive the reference signal generated by a wireless user endpoint 140 and may forward the received reference signal to their associated control unit 110. Using any suitable system, method, or device, (e.g., a check error sum function) the control unit 110 may ignore the reference signal if the reference signal does not correspond with a group ID of which the control unit 110 is associated. Alternatively, if the reference signal does correspond with a group ID of which the control unit 110 is associated, the control unit 110 may perform one or more channel estimations between one or more transceivers 120 and the wireless user endpoint 140 based on the reference signal received from the wireless user endpoint 140. The control unit 110 may then determine which transceivers 120 of the group of transceivers 120 may provide wireless communication service for the wireless user endpoint 140 based on the channel estimations. Additionally, in many instances, the channel estimations may indicate the location of the wireless user endpoint 140, such that the control unit 110 may determine the location of the wireless user endpoint 140 based on the estimations. Accordingly, the control unit 110 may also or alternatively determine which transceivers 120 may provide wireless communication service for the wireless user endpoint 140 based on the location of the wireless user endpoint 140. Therefore, the control unit 110 may dynamically organize a service cluster of transceivers 120 that may provide wireless coverage for the wireless user endpoint 140 based on the reference signal generated by the wireless user endpoint 140.

For example, one or more transceivers 120 of sub-networks 102a and 102b may receive a reference signal generated by wireless user endpoint 140a. The transceivers 120 may forward the reference signal to their respective control unit 110 (e.g., control units 110a and 110b). Control unit 110b may ignore the reference signal generated by wireless user endpoint 140a because the reference signal may correspond with the group ID of sub-network 102a and not sub-network 102b. Conversely, control unit 110a, may estimate the channels between wireless user endpoint 110a and one or more transceivers 120 of sub-network 102a because the reference signal generated by wireless user endpoint 102a may correspond with the group ID of sub-network 102a.

Based on the channel estimation, a control unit 110 may determine which transceivers 120 may provide wireless communication service to a wireless user endpoint 140. For example, the channel estimations performed by control unit 110a may indicate that transceivers 120a, 120b, and 120c may adequately and efficiently provide wireless communication service to wireless user endpoint 140a. Control unit 110 may consequently select transceivers 120a, 120b, and 120c to provide wireless communication service for wireless user endpoint 140a based on the estimated channels.

As mentioned above, in many instances the channel estimates may be based on the location of the wireless user endpoint 140 with respect to the transceivers 120 such that the stronger channels may be associated with the transceivers 120 closest to wireless user endpoint 140. Therefore, a reference signal generated by a wireless user endpoint 140 may be used by a control unit 110 to determine the location of the wireless user endpoint 140 also.

A wireless user endpoint 140 may configure and generate a reference signal based on a variety of factors in addition to the group ID. For example, a wireless user endpoint 140 may generate a reference signal based on a unique identifier associated with the wireless user endpoint 140 such that a control unit 110 processing reference signals may distinguish between reference signals generated by different wireless user endpoints 140. A wireless user endpoint 140 may, in the same or alternative embodiments, be configured to generate a unique reference signal pattern (e.g., time, frequency, and/or code sequences) such that the wireless user endpoint 140 may be identified based on its unique reference signal pattern. A wireless user endpoint 140 may also generate a reference signal based on the antenna configuration of the wireless user endpoint 140, the frequency band of the transceivers within the service cluster, and/or the available transmission bandwidth.

Also, a wireless user endpoint 140 may generate and transmit a reference signal based on traffic data patterns of the wireless user endpoint 140. For example, if a wireless user endpoint 140 is not communicating uplink traffic, the wireless user endpoint 140 may generate and transmit the reference signal as a way of providing an update on its location. In some embodiments, when sending a location update, the wireless user endpoint 140 may transmit only a portion of the reference signal and the serving cluster of transceivers 120 may send an acknowledge (ACK) signal to the wireless user endpoint 140 upon receiving the location updating reference signal. Such a configuration may allow for location updates without the wireless user endpoint 140 performing a random access procedure for location update.

Further, a wireless user endpoint 140 may adjust the repetition rate of a reference signal based on the charge of a battery of the wireless user endpoint 140. For example, if the battery of a wireless user endpoint 140 is running low, the wireless user endpoint 140 may reduce how often it generates and transmits a reference signal to reduce power consumption. In contrast, if the battery is almost fully charged, the wireless user endpoint 140 may generate and transmit a reference signal more often.

Additionally, a wireless user endpoint 140 may adjust the repetition rate of a reference signal based on the speed of the wireless user endpoint 140 to allow for appropriate location monitoring of the wireless user endpoint 140 and consequently to allow for changes in the service cluster. For example, if a wireless user endpoint 140 is stationary, the delay between transmitting reference signals may be increased because the location of the wireless user endpoint 140 is not changing. Accordingly, a control unit 110 may not need to make changes in the service cluster of transceivers 120 providing wireless service to the wireless user endpoint 140. In contrast, if a wireless user endpoint 140 is moving, the wireless user endpoint 140 may transmit a reference signal more often to provide more frequent channel estimations and accordingly accurate updates on the location of the wireless user endpoint 140. Consequently, a control unit 110 may more accurately determine and change which transceivers 140 may provide wireless communication service to the wireless user endpoint 140.

Therefore, in accordance with one or more embodiments of the present disclosure, a wireless user endpoint 140 may perform general channel estimation for groups of transceivers 120 based on reference signals associated with the respective groups. Based on the general channel estimation, the wireless user endpoint 140 may select a general group of transceivers 120 that may provide wireless communication service to the wireless user endpoint 140. But, a control unit 110 may select which specific transceivers 120 of the general group may provide wireless communication service to the wireless user endpoint 140 based on a reference signal generated by the wireless user endpoint 140. Accordingly, much of the channel estimation and selection of transceivers 120 that may provide wireless communication service for a wireless user endpoint 140 may be on the network side instead of on the wireless user endpoint side. This configuration may allow for reduced power consumption by a wireless user endpoint 140 because the wireless user endpoint 140 may not need to perform as many individual channel estimations associated with different transceivers 120. Such a configuration may be especially advantageous in distributed antenna networks with densely distributed transceivers 120.

Modifications, additions, or omissions may be made to distributed antenna system 100 without departing from the scope of the present disclosure. For example, the number of sub-networks 102, and control units 110 and transceivers 120 included in each sub-network may vary. Additionally, the organization of groups of transceivers 120 and control units 110 having group IDs may vary. Further, in some embodiments control units 110 may be located within a transceiver 120 or separate from a transceiver 120.

Figure 2:
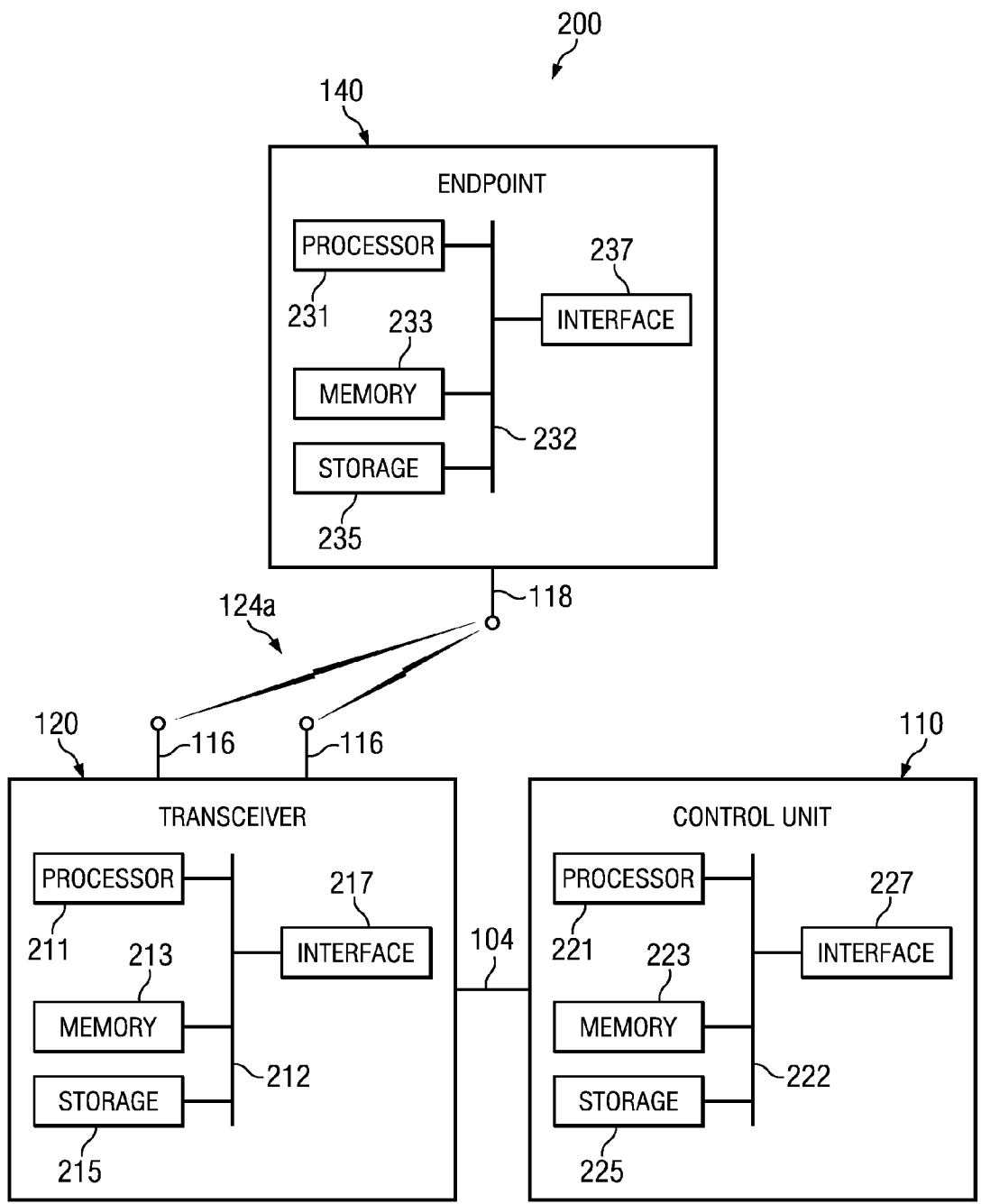
FIG. 2 illustrates a block diagram of computing systems that may facilitate the operations of various components of FIG. 1, in accordance with some embodiments of the present disclosure.

FIG. 2 depicts example computing systems that may facilitate the operations of various components of FIG. 1. FIG. 2 includes an example antenna system 200 with an example transceiver 120, control unit 110, and wireless user endpoint 140. Antenna system 200 may correspond to at least a portion of antenna system 100 of FIG. 1. Transceiver 120, control unit 110 and wireless user endpoint 140 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of transceiver 120, control unit 110, and wireless user endpoint 140 may comprise any suitable physical form, configuration, number, type and/or layout. As an example, and not by way of limitation, transceiver 120, control unit 110, and/or wireless user endpoint 140 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, transceiver 120, control unit 110, and/or wireless user endpoint 140 may include one or more computer systems; be unitary or distributed; span multiple locations; span multiple machines; or reside in a cloud, which may include one or more cloud components in one or more networks.

In the depicted embodiment, transceiver 120, control unit 110, and wireless user endpoint 140 each include their own respective processors 211, 221, and 231; memory 213, 223, and 233; storage 215, 225, and 235; interfaces 217, 227, and 237; and buses 212, 222, and 232. Although a particular antenna system is depicted having a particular number of particular components in a particular arrangement, this disclosure contemplates any suitable antenna system 200 having any suitable number of any suitable components in any suitable arrangement. For simplicity, similar components of transceiver 120, control unit 110, and wireless user endpoint 140 will be discussed together. However, it is not necessary for these devices to have the same components, or the same type of components. For example, processor 211 may be a general purpose microprocessor and processor 231 may be an application specific integrated circuit (ASIC).

Processors 211, 221 and 231 may be a microprocessor, controller, or any other suitable computing device, resource, or combination of hardware, software and/or encoded logic operable to provide, either alone or in conjunction with other components, (e.g., memory 213, 223, and 233, respectively) wireless networking functionality. Such functionality may include performing the various operations of transceiver 120, control unit 110, and wireless user endpoint 140 discussed herein with respect to FIG. 1.

In particular embodiments, processors 211, 221, and 231 may include hardware for executing instructions, such as those making up a computer program. As an example and not by way of limitation, to execute instructions, processor 211, 221, and 231 may retrieve (or fetch) instructions from an internal register, an internal cache, memory 213, 223, or 233, respectively, or storage 215, 225 or 235 respectively; decode and execute them; and then write one or more results to an internal register, an internal cache, memory 213, 223, or 233, respectively, or storage 215, 225, or 235 respectively.

In particular embodiments, processors 211, 221, and 231 may include one or more internal caches for data, instructions, or addresses. This disclosure contemplates processors 211, 221, and 231 including any suitable number of any suitable internal caches, where appropriate. As an example and not by way of limitation, processors 211, 221, and 231 may include one or more instruction caches, one or more data caches, and one or more translation lookaside buffers (TLBs). Instructions in the instruction caches may be copies of instructions in memory 213, 223, or 233, respectively, or storage 215, 225, or 235, respectively, and the instruction caches may speed up retrieval of those instructions by processor 211, 221, or 231, respectively. Data in the data caches may be copies of data in memory 213, 223, or 233, respectively, or storage 215, 225, or 235, respectively, for instructions executing at processor 211, 221, or 231, respectively, to operate on; the results of previous instructions executed at processor 211, 221, or 231 for access by subsequent instructions executing at processor 211, 221, or 231, or for writing to memory 213, 223, or 233, respectively, or storage 215, 225, or 235, respectively; or other suitable data. The data caches may speed up read or write operations by processor 211, 221, or 231. The TLBs may speed up virtual-address translations for processor 211, 221, or 231. In particular embodiments, processors 211, 221, and 231 may include one or more internal registers for data, instructions, or addresses. Depending on the embodiment, processors 211, 221, and 231 may include any suitable number of any suitable internal registers, where appropriate. Where appropriate, processors 211, 221, and 231 may include one or more arithmetic logic units (ALUs); be a multi-core processor; include one or more processors 211; or any other suitable processor.

Memory 213, 223, or 233 may be any form of volatile or non-volatile memory including, without limitation, magnetic media, optical media, random access memory (RAM), read-only memory (ROM), flash memory, removable media, or any other suitable local or remote memory component or components. In particular embodiments, memory 213, 223, or 233 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213, 223, or 233 may include one or more memories 213, 223, or 233, respectively, where appropriate. Memory 213, 223, or 233 may store any suitable data or information utilized by transmission site 108a, transmission site 108b, or endpoint 110, respectively, including software embedded in a computer readable medium, and/or encoded logic incorporated in hardware or otherwise stored (e.g., firmware). In particular embodiments, memory 213, 223, or 233 may include main memory for storing instructions for processor 211, 221, or 231, respectively, to execute or data for processor 211, 221, or 231 to operate on. In particular embodiments, one or more memory management units (MMUs) may reside between processor 211, 221, or 231 and memory 213, 223, or 233, respectively, and facilitate accesses to memory 213, 223, or 233 requested by processor 211, 221, or 231, respectively.

As an example and not by way of limitation, transceiver 120, control unit 110, or wireless user endpoint 140 may load instructions from storage 215, 225, or 235, respectively, or another source (such as, for example, another computer system, another base station, or a remote transmission site) to memory 213, 223, or 233, respectively. Processor 211, 221, or 231 may then load the instructions from memory 213, 223, or 233, respectively, to an internal register or internal cache. To execute the instructions, processor 211, 221, or 231 may retrieve the instructions from the internal register or internal cache and decode them. During or after execution of the instructions, processor 211, 221, or 231 may write one or more results (which may be intermediate or final results) to the internal register or internal cache. Processor 211, 221, or 231 may then write one or more of those results to memory 213, 223, or 233, respectively. In particular embodiments, processor 211, 221, or 231 may execute only instructions in one or more internal registers or internal caches or in memory 213, 223, or 233, respectively (as opposed to storage 215, 225, or 235, respectively, or elsewhere) and may operate only on data in one or more internal registers or internal caches or in memory 213, 223, or 233, respectively (as opposed to storage 215, 225, or 235, respectively, or elsewhere).

In particular embodiments, storage 215, 225, or 235 may include mass storage for data or instructions. As an example and not by way of limitation, storage 215, 225, or 235 may include a hard disk drive (HDD), a floppy disk drive, flash memory, an optical disc, a magneto-optical disc, magnetic tape, or a Universal Serial Bus (USB) drive or a combination of two or more of these. Storage 215, 225, or 235 may include removable or non-removable (or fixed) media, where appropriate. Storage 215, 225, or 235 may be internal or external to transmission site 108, where appropriate. In particular embodiments, storage 215, 225, or 235 may be non-volatile, solid-state memory. In particular embodiments, storage 215, 225, or 235 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215, 225, or 235 may take any suitable physical form and may comprise any suitable number or type of storage. Storage 215, 225, or 235 may include one or more storage control units facilitating communication between processor 211, 221, or 231, respectively, and storage 215, 225, or 235, respectively, where appropriate. In some embodiments, storage 215, 225, and 235.

In particular embodiments, interface 217, 227, or 237 may include hardware, encoded software, or both providing one or more interfaces for communication (such as, for example, packet-based communication) between transmission sites 108, endpoints 110, any networks, any network devices, and/or any other computer systems. As an example and not by way of limitation, communication interface 217, 227, or 237 may include a network interface controller (NIC) or network adapter for communicating with an Ethernet or other wire-based network and/or a wireless NIC (WNIC) or wireless adapter for communicating with a wireless network.

In some embodiments, interface 217 comprises one or more radios coupled to one or more antenna ports 116. In such an embodiment, interface 217 receives digital data (e.g., from control unit 110 via connection 104) that is to be sent out to wireless devices, such as endpoints 140, via a wireless connection. The radio may convert the digital data into a radio signal having the appropriate center frequency, bandwidth parameters, and transmission power. Similarly, the radio may convert radio signals received via one or more receiving antennas into digital data to be processed by, for example, processor 211 and/or forwarded to control unit 110 to be processed by for example, processor 221. Interface 237 of endpoint 110 may be configured to perform similar operations via processor 231 and antenna port 118.

Depending on the embodiment, interface 217, 227, or 237 may be any type of interface suitable for any type of network for which antenna system 200 is used. As an example and not by way of limitation, antenna system 200 may communicate with an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, antenna system 200 may communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. transceiver 120, control unit 110, and wireless user endpoint 140 may include any suitable interface 217, 227, or 237, respectively, for any one or more of these networks, where appropriate.

In some embodiments, interface 217, 227, or 237 may include one or more interfaces for one or more I/O devices. One or more of these I/O devices may enable communication between a person and a transceiver 120, control unit 110, or wireless user endpoint 140. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 217, 227, or 237 for them. Where appropriate, interface 217, 227, or 237 may include one or more drivers enabling processor 211, 221, or 231, respectively to drive one or more of these I/O devices. Interface 217, 227, or 237 may include one or more interfaces 217, 227, or 237, respectively, where appropriate.

Bus 212, 222, or 232 may include any combination of hardware, software embedded in a computer readable medium, and/or encoded logic incorporated in hardware or otherwise stored (e.g., firmware) to couple components of a transmission site 108 or endpoint 110 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212, 222, or 232 may include any number, type, and/or configuration of buses 212, 222, or 232, where appropriate. In particular embodiments, one or more buses 212, 222, or 232 (which may each include an address bus and a data bus) may couple processor 211, 221, or 231, respectively, to memory 213, 223, or 233, respectively. Bus 212, 222, or 232 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 211, 221, or 231 (such as, for example, one or more internal registers or caches), one or more portions of memory 213, 223, or 233, one or more portions of storage 215, 225, or 235, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Accordingly, the above mentioned components of transceiver 120, control unit 110, and wireless user endpoint 140 may enable transceiver 120, control unit 110, and wireless user endpoint 140 to perform operations such as dynamic service clustering according to the present disclosure.

Modifications, additions, or omissions may be made to FIG. 2 without departing from the scope of the present disclosure. For example, any of the options or features described herein may be utilized in combination with the illustrated embodiments of FIGURE and 2 and/or any number of the other options or features also described herein as would be understood by one of ordinary skill in the art.

Figure 3:
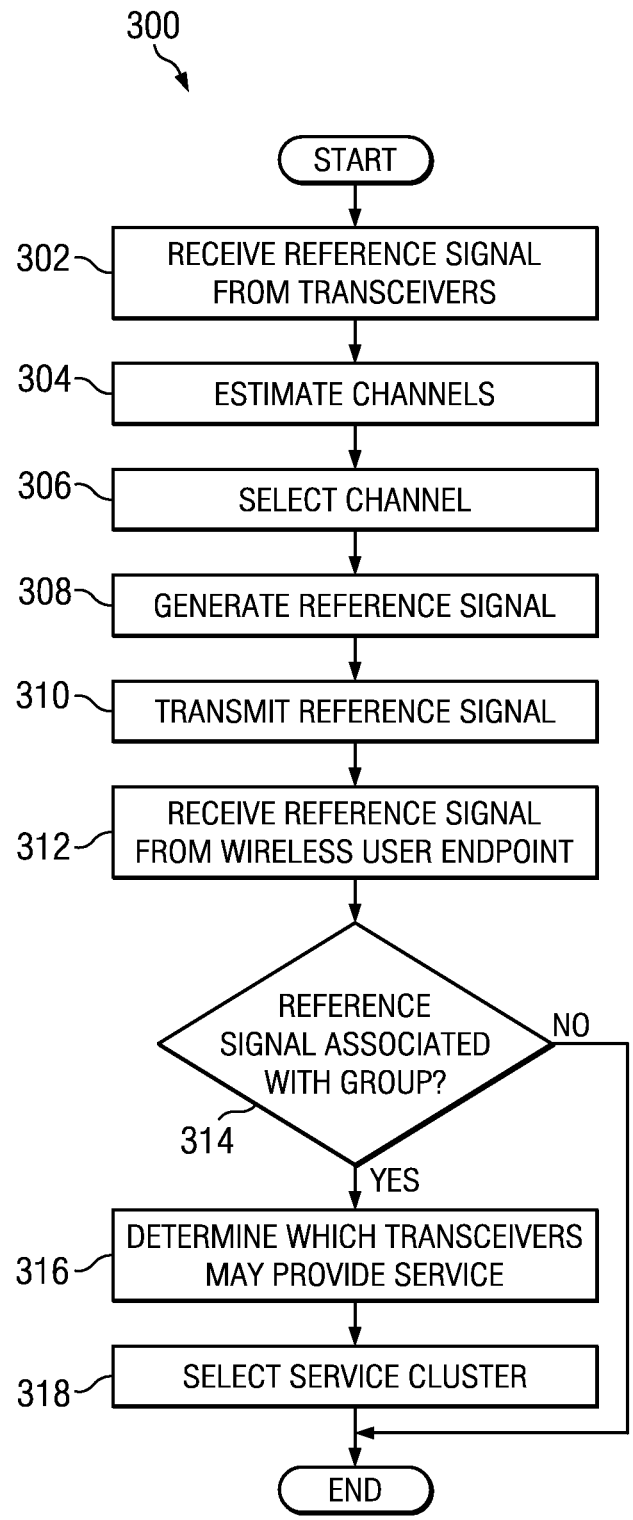
FIG. 3 illustrates an example method for selecting transceivers to provide wireless communication service for a wireless user endpoint, in accordance with some embodiments of the present disclosure.

FIG. 3 illustrates an example method 300 for selecting transceivers to provide wireless communication service for a wireless user endpoint. One or more steps of method 300 may be performed using any suitable system, apparatus or device. For example, one or more steps of method 300 may be performed by at least one of a control unit 110, a transceiver 120 and a wireless user endpoint 140 described above with respect to FIGS. 1 and 2. As such, to simplify the description of FIG. 3, steps of method 300 are described as being performed by control unit 110, transceiver 120, and wireless user endpoint 140. However, such a description is by way of example only and various steps may be performed by different components than those indicated.

Method 300 may start and at step 302, a wireless user endpoint 140 within range of a distributed antenna network may receive one or more reference signals from one or more transceivers 120 of the distributed antenna network. At step 304, the wireless user endpoint may estimate one or more channels associated with the one or more received reference signals. At step 306, the wireless user endpoint 140 may select a channel for wireless communication based on the channel estimation performed at step 304. As described above, transceivers 120 may be organized into groups where each transceiver 120 of the same group generates and transmits the same reference signal. Therefore, from the perspective of the wireless user endpoint 140, the plurality of same reference signals may be associated with the same channel such that a selected channel may include a plurality of transceivers 120.

The wireless user endpoint 140 may generate a reference signal based on the selected channel at step 309. For example, as described above, a channel and its respective transceivers 120 may be associated with a group having a group ID. Therefore the user endpoint 140 may generate a reference signal based on the group ID associated with the selected channel. The wireless user endpoint 140 may also generate the reference signal based on a variety of factors such as those described above with respect to FIG. 1. At step 310, the wireless user endpoint 140 may transmit its reference signal.

At step 312 one or more transceivers 120 may receive the reference signal generated by the wireless user endpoint 140. At step 314 the transceivers 120 may determine whether the reference signal corresponds to the group ID associated with the respective transceivers 120. If the reference signal corresponds to the group ID associated with a transceiver 120, the transceiver 120 may forward the reference signal and/or data associated with the reference signal to a control unit 110 associated with the transceiver 120 and method 300 may proceed to step 316. If the reference signal does not correspond to the group ID associated with a transceiver 120, the transceiver 120 may ignore the reference signal and method 300 may end. In alternative embodiments, a transceiver 120 may forward data associated with the received reference signal to a control unit 110 associated with the transceiver 120. The control unit 110 may determine whether the reference signal is associated with the group ID of the respective transceivers 120.

At step 316, the control unit 110 may determine which transceivers 120 may provide wireless communication service to the wireless user endpoint 140 based on the reference signal received by the transceivers 120 from the wireless user endpoint 140. For example, as described above, the control unit 110 may estimate the channels between the wireless user endpoint 140 and the transceivers 120 that receive the reference signal from the wireless user endpoint 140. Based on the channel estimations, the control unit 110 may determine which transceivers 120 may best provide wireless communication service to the wireless user endpoint 140. At step 318, based on this determination, the control unit 110 may select a group (or "service cluster") of transceivers 120 that may provide wireless communication service to the wireless user endpoint 140. Following step 318, method 300 may end.

Therefore, in accordance with one or more embodiments of the present disclosure, method 300 may be used to generate a reference signal by a wireless user endpoint 140 and a group of transceivers 120 may be selected to provide wireless communication service for the wireless user endpoint 140 based on the reference signal. Accordingly, much of the channel estimation and selection of transceivers 120 that may provide wireless communication service for a wireless user endpoint 140 may be on the network side instead of on the wireless user endpoint side. This configuration may allow for reduced power consumption by a wireless user endpoint 140 because the wireless user endpoint 140 may not need to perform as many individual channel estimations associated with different transceivers 120. Such a configuration may be especially advantageous in distributed antenna networks with densely distributed transceivers 120.

Modifications, additions, or omissions may be made to method 300 without departing from the scope of the present disclosure. For example, as mentioned above, different components may perform different operations than those explicitly described. Further, the order of operations of each step may vary from what is described. Additionally, each step may include a plurality of other steps other than those specifically described.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed:

1. A method for selecting transceivers to provide wireless communication service for a wireless user endpoint comprising:
receiving a reference signal generated by the wireless user endpoint for reception by a first plurality of transceivers, the first plurality of transceivers each having a wired connection to a control unit to form a distributed antenna system;
determining by the control unit that the reference signal is associated with the first plurality of transceivers, wherein the reference signal is associated with a group identifier (group ID) associated with the first plurality of transceivers and wherein determining that the reference signal is associated with the first plurality of transceivers is based on the group ID;
determining at least one characteristic of at least one communication channel between a wireless user endpoint and a first plurality of transceivers based on the reference signal;
analyzing the at least one characteristic of the at least one communication channel; and
selecting at least one transceiver of the first plurality of transceivers to provide wireless communication service for the wireless user endpoint based on the at least one characteristic of the at least one communication channel.

2. The method of claim 1, further comprising:
determining that the reference signal is not associated with a second plurality of transceivers; and
ignoring the reference signal as received by the second plurality of transceivers based on the reference signal not being associated with the second plurality of transceivers.

3. The method of claim 2, wherein determining that the reference signal is not associated with the second plurality of transceivers is based on the group ID.

4. The method of claim 1, wherein the reference signal is based on a battery status of the wireless user endpoint.

5. The method of claim 1, wherein the reference signal is based on a speed of the wireless user endpoint.

6. The method of claim 1, further comprising determining a location of the wireless user endpoint based on the reference signal.

7. The method of claim 1, wherein the reference signal is based on a unique identifier associated with the wireless user endpoint.

8. The method of claim 1, wherein the reference signal is based on a unique reference signal pattern associated with the wireless user endpoint.

9. A distributed antenna system comprising:
a first plurality of transceivers configured to receive a reference signal generated by a wireless user endpoint; and
a first control unit communicatively coupled to the first plurality of transceivers using a wired connection to form the distributed antenna system, the first control unit configured to:
determine that the reference signal is associated with the first plurality of transceivers, wherein the reference signal is associated with a group identifier (group ID) associated with the first plurality of transceivers and wherein determining that the reference signal is associated with the first plurality of transceivers is based on the group ID;
determine at least one characteristic of at least one communication channel between the wireless user endpoint and the first plurality of transceivers based on the reference signal generated by the wireless user endpoint;
analyze the at least one characteristic of the at least one communication channel; and
select at least one transceiver of the first plurality of transceivers to provide wireless communication service for the wireless user endpoint based on the at least one characteristic of the at least one communication channel.

10. The distributed antenna system of claim 9, further comprising:
a second plurality of transceivers configured to receive the reference signal generated by the wireless user endpoint; and
a second control unit communicatively coupled to the second plurality of transceivers and configured to ignore the reference signal as received by the second plurality of transceivers based on a determination that the reference signal is not associated with the second plurality of transceivers.

11. The distributed antenna system of claim 10, wherein the determination that the reference signal is not associated with the second plurality of transceivers is based on the group ID.

12. The distributed antenna system of claim 9, wherein the reference signal is based on a battery status of the wireless user endpoint.

13. The distributed antenna system of claim 9, wherein the reference signal is based on a speed of the wireless user endpoint.

14. The distributed antenna system of claim 9, wherein the first control unit is further configured to determine a location of the wireless user endpoint based on the reference signal.

15. The distributed antenna system of claim 9, wherein the reference signal is based on a unique identifier associated with the wireless user endpoint.

16. The distributed antenna system of claim 9, wherein the reference signal is based on a unique reference signal pattern associated with the wireless user endpoint.

* * * * *